(12) United States Patent
Zhang et al.

(10) Patent No.: US 8,078,625 B1
(45) Date of Patent: Dec. 13, 2011

(54) URL-BASED CONTENT CATEGORIZATION

(75) Inventors: Jianping Zhang, Falls Church, VA (US);
Jinshui Qin, Vienna, VA (US); Qiuming Yan, Vienna, VA (US)

(73) Assignee: AOL Inc., Dulles, VA (US)

( * ) Notice: Subject to any disclaimer, the term of this patent is extended or adjusted under 35 U.S.C. 154(b) by 149 days.

(21) Appl. No.: 11/530,752

(22) Filed: Sep. 11, 2006

(51) Int. Cl.
*G06F 7/00* (2006.01)

(52) U.S. Cl. ........ 707/748; 707/782; 707/783; 707/784; 707/952

(58) Field of Classification Search .................. None
See application file for complete search history.

(56) References Cited

U.S. PATENT DOCUMENTS

| | | | |
|---|---|---|---|
| 5,418,951 A * | 5/1995 | Damashek | 707/5 |
| 6,161,130 A | 12/2000 | Horvitz et al. | |
| 6,199,103 B1 | 3/2001 | Sakaguchi et al. | |
| 6,330,590 B1 | 12/2001 | Cotten | |
| 6,421,709 B1 | 7/2002 | McCormick et al. | |
| 6,507,866 B1 | 1/2003 | Barchi | |
| 6,976,070 B1 * | 12/2005 | Hoashi et al. | 709/224 |
| 7,555,523 B1 * | 6/2009 | Hartmann | 709/206 |
| 2002/0116463 A1 | 8/2002 | Hart | |
| 2002/0116641 A1 | 8/2002 | Mastrianni | |
| 2002/0181703 A1 | 12/2002 | Logan et al. | |
| 2002/0199095 A1 | 12/2002 | Bandini et al. | |
| 2003/0225763 A1 * | 12/2003 | Guilak et al. | 707/7 |
| 2005/0022031 A1 * | 1/2005 | Goodman et al. | 713/201 |
| 2006/0149710 A1 * | 7/2006 | Koningstein et al. | 707/3 |

OTHER PUBLICATIONS

Author: Gary Robinson; Title: A statistical approach to the spam problem; Date: year 2003; Publisher: ACM Digital Library; vol. 2003; Pertinent pp. 1-10 (as renumbered).*

A Kolcz et al., "SVM-based Filtering of E-mail Spam with Content-specific Misclassification Costs," TextDM' 2001 (IEE ICDM-2001 Workshop on Text Mining), San Jose, CA 2001.

A. McCallum and K. Nigam. A comparison of event models for Naïve Bayes text classification. In Proceedings of the *AAAI-98 Workshop on Learning for Text Categorization*, 1998.

C. Lin, *Formulations of support vector machines: A note from an optimization point of view*, Neural Computation, 13 (2001), pp. 307-317.

F. Provost and T. Fawcett. Robust Classification for Imprecise Environments. *Machine Learning*, 42:203-231, 2001.

G. Sakkis, I. Androutsopoulso, G. Paliouras, V. Karkaletsis, C. Spyropoulos, and P. Stamatopoulos. Stacking Classifiers for Anti-Spam Filtering of E-Mail. In L. Lee and D. Harman editors, *Proceedings of the 6th Conference on Empirical Methods in Natural Language Processing (EMNLP 2001)*, pp. 44-50. Carnegie Mellon University, 2001.

G. Schohn and D. Cohn. Less is more: *Active learning with support vector machines. In Proc. 17th International Conf. on Machine Learning*, pp. 839-846. Morgan Kaufmann, San Francisco, CA, 2000.

(Continued)

*Primary Examiner* — Tim T Vo
*Assistant Examiner* — Anh Tai Tran
(74) *Attorney, Agent, or Firm* — Finnegan, Henderson, Farabow, Garrett & Dunner, LLP

(57) ABSTRACT

Content may be categorized by accessing a URL associated with the content, determining a set of n-grams contained in the URL, and determining a category of the content based on the set of n-grams.

31 Claims, 9 Drawing Sheets

OTHER PUBLICATIONS

G. Weiss and F. Provost. The effect of class distribution on classifier learning: an empirical study. Technical Report ML-TR-44, Department of Computer Science, Rutgers University, 2002.

H. Drucker et al., "Support Vector Machines for Spam Categorization," IEEE Transactions on Neural Networks, vol. 10, No. 5, Sep. 1999.

H. Kaitarai. Filtering Junk E-Mail.: A Performance Comparison between Genetic Programming and Naïve Bayes. Technical Report (presented at the Fall 1999 Meeting of the CMU Text Learning Group), Department of Electrical and Computer Engineering, University of Waterloo, Nov. 1999.

http://www.paulgraham.com/better.html, Better Bayesian Filtering, Jan. 2003, pp. 1-11.

I. Androutsopoulos, G. Paliouras, V. Karkaletsis, G. Sakkis, C. Spyropoulos, and P. Stamatopoulos. Learning to Filter Spam E-Mail: A Comparison of a Naïve Bayesian and a Memory-Based Approach. In H. Zaragoza, P. Gallinari, and M. Rajman, editors, *Proceedings of the Workshop on Machine Learning and Textual Information Access, 4th European Conference on Principles and Practice of Knowledge Discovery in Databases (PKDD 2000)*, pp. 1-13. 2000.

I. Androutsopoulos, J. Koutsias, K. Chandrinos, G. Paliouras, and C. Spyropoulos. An Evaluation of Naïve Bayesian Anti-Spam Filtering. In G. Potamias, V. Moustakis, and M. van Someren, editors, *Proceedings of the Workshop on Machine Learning in the New Information Age: 11th European Conference on Machine Learning (EMCL 2000)*, pp. 9-17. 2000.

I. Androutsopoulos, J. Koutsias, K. Chandrinos, G. Paliouras, and C. Spyropoulos. An Experimental Comparison of Naïve Bayesian and Keyword-Based Anti-Spam Filtering with Encrypted Personal E-mail Messages. In N. Belkin, P. Ingwersen, and M. Leong, editors, *Proceedings of the 23rd Annual International ACM SIGIR Conference on Research and Development in Information Retrieval (SIGIR 2000)*, pp. 160-167. 2000.

J. D. M. Rennie. Improving multi-class text classification with Naïve Bayes. Technical Report AITR-2001-004, Massachusetts Institute of Technology, 2001.

J. Diederich, J. Kindermann, E. Leopold, and G. Paass. Authorship Attribution with Support Vector Machines. In *Proceedings of the Learning Workshop*, Snowbird, Utah, 2000.

J. G. Hidalgo, M. M. López, and E. P. Sanz. Combining Text and Heuristics for Cost-Sensitive Spam Filtering. In *Proceedings of the Fourth Computational Natural Language Learning Workshop, CoNLL-2000*, Lisbon, Portugal, 2000. Association for Computational Linguistics.

J. Platt, *Fast training of support vector machines using sequential minimal optimization*, in Advances in Kernel Methods—Support Vector Learning, B. Schölkopf, C. Burges, and A. Smola, eds., MIT Press, 1999.

I. Provost. Naïve-Bayes vs . Rule-Learning in Classification of Email. Technical report, Dept. of Computer Sciences at the U. of Texas at Austin, 1999.

M. Hearst et al., Support Vector Machines, IEE Intelligent Systems, Jul./Aug. 1998.

M. Sahami, S. Dumais, D. Heckerman, and E. Horvitz. A Bayesian Approach to Filtering Junk E-Mail. In *Proceedings of the AAAI-98 Workshop on Learning for Text Categorization*, 1998.

P. Bennett, *Assessing the calibration of naive bayes' posterior estimates*, tech. report, Dept. of Computer Science, School of Science, Carnegie Mellon University 2000.

P. Domingos, *MetaCost: A general method for making classifiers cost-sensitive*, in Proceedings of the Fifth International Conference of Knowledge Discovery and Data Mining, ACM Press, 1999, pp. 155-164.

P. Pantel and D. Lin. SpamCop: A Spam Classification & Organization Program. In *Learning for Text Categorization: Papers from the 1998 Workshop*, Madison, Wisconsin, 1998. AAAI Technical Report WS-98-05.

R. Segal and J. Kephart. Incremental Learning in SwiftFile. In Proceedings of the Seventh International Conference on Machine Learning, 2000.

S. Dumais, J. Platt, D. Heckerman, and M. Sahami, *Inductive learning algorithms and representations for text categorization*, in Proceedings of 7th International Conference on Information and Knowledge Management, 1998, pp. 229-237.

S. Eyheramendy, D. Lewis, and D. Madigan. On the Naïve Bayes model for text categorization. In *Proceedings of the Ninth International Workshop on Artcial Intelligence and Statistics*, 2003.

T. Joachims, "Text Categorization with Support Vector Machines: Learning with Many Relevant Features", University of Dortmund, Computer Science Dept., LS-8 Report 23, 1998.

Y. Yang and J. P. Pedersen. A comparative study on feature selection in text categorization. In *Proceedings of the Fourteenth International Conference on Machine Learning (ICML '97)*, pp. 412-420, 1997.

\* cited by examiner

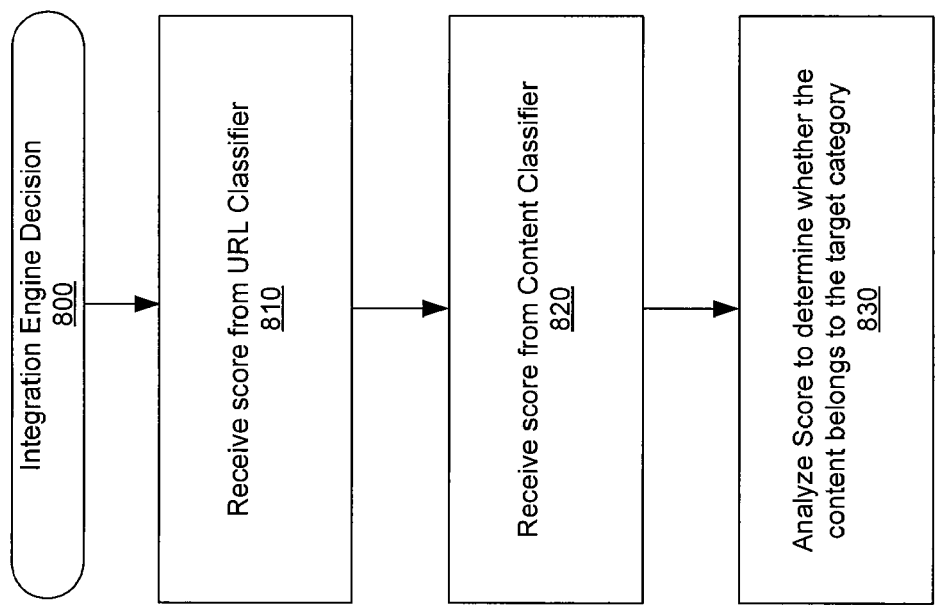

URL-BASED CONTENT CATEGORIZATION

TECHNICAL FIELD

This document relates to categorizing content.

BACKGROUND

Some content, such as, for example, web pages on the Internet, may not be appropriate for all users. Content may be categorized and filtered accordingly to reduce the availability of content inappropriate for users. Due to the growth of Internet traffic, lack of central management of web content, and the desire to prevent people, especially children, from seeing offensive or inappropriate materials on the Internet, web-filters have been developed to block access to certain objectionable web pages, such as pornographic web pages. Accurate web-filters rely on correct recognition of inappropriate web content, which involves a task of content categorization.

Manual and automated approaches to web content categorization may be used separately or in combination. In a manual approach, human analysts tag web pages with categories according to their content. The uniform resource locators (URLs) of these manually categorized web pages together with their category tags are stored in a database for future use. To categorize a web page, its URL is matched against the pre-categorized URLs in the database. If a match is found, the web page is classified in the category of the matched URL. Otherwise, the category of the web page is unknown.

An automated approach may apply machine learning techniques to create models of categories from the textual content of a set of pre-categorized training web pages. The learned models are then applied to dynamically classify web pages. An automated approach may complement a manual approach, and may be able to assign a category to every web page, and to handle new and dynamically-generated web pages.

SUMMARY

In one general aspect, categorizing content includes accessing a URL associated with content, determining a set of n-grams contained in the URL, and determining a category of the content based on the set of n-grams.

Implementations may include one or more additional features. For instance, the URL may be processed to remove characters unrepresentative of content and non-alphabetical characters. The removed characters may be replaced with one or more alphabetical character.

Determining a set of n-grams contained in the uniform resource locator may include determining a set of n-grams that includes n-grams for a range of n's. Determining a category of the content may includes using a classifier to determine a score based on the set of n-grams and comparing the score to a threshold. Determining a category of the content may include determining a category for the content based on the set of n-grams and an analysis of the content.

Determining a category of the content also may include using a first classifier to determine a first score based on the set of n-grams, using a second classifier to determine a second score based on the content, and determining a category of the content based on the first score and the second score. Determining a category of the content based on the first score and the second score may include generating a sum of the first score and the second score and comparing the sum to a threshold, and may include determining if either of the first score or the second score is above a threshold.

The content may be included in a web page.

In another general aspect, a system for categorizing content includes an n-gram generator configured to access a uniform resource locator associated with the content and determine a set of n-grams contained in the uniform resource locator, a classifier configured to determine a URL score based on the set of n-grams, and a categorizer configured to categorize the content based on the URL score.

Implementations may include one or more of the features noted above.

In addition, a content-based classifier may be configured to determine a content score based on the content, such that the categorizer is configured to categorize the content based on the URL score and the content score In a further general aspect, a system for categorizing content includes a URL-based classifier configured to produce a first score based on a set of n-grams contained in URL associated with the content, a content-based classifier configured to produce a second score based on the content, and an integration engine configured to determine a category of the content based on the first score and the second score.

Implementations may include one or more of the features noted above.

In addition, the integration engine may be configured to generate a sum of the first score and the second score and compare the sum to a threshold to determine a category of the content based on the first score and the second score. To generate the sum of the first score and the second score, the integration engine may be configured to generate a weighted linear sum of the first score and the second score, or to generate a probabilistic sum of the first score and the second score. To determine a category of the content based on the first score and the second score, the integration engine may be configured to determine if either of the first score or the second scores is above a threshold.

Implementations of the desired techniques may include hardware, a method, or computer software on a computer accessible medium. The details of one or more implementations are set forth in the accompanying drawings and the description below. Other features will be apparent from the description and drawings, and the claims.

DESCRIPTION OF DRAWINGS

FIG. 8 is a flow chart illustrating a process by which an integration engine determines a decision.

DETAILED DESCRIPTION

Figure 1:
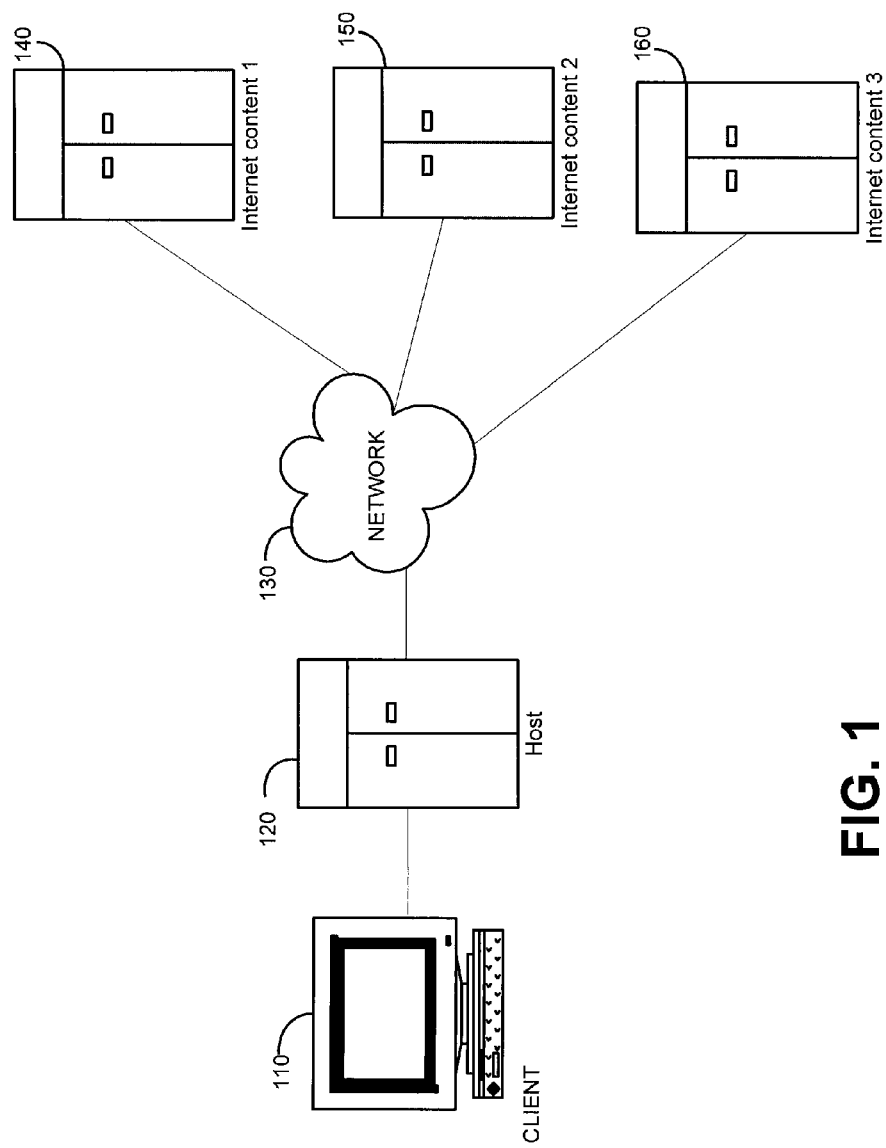
FIG. 1 is a block diagram illustrating an example of a system in which content may be categorized.

In general, a content blocking program may be used to block inappropriate Internet content from users. For example, when an individual attempts to access a web page, the content blocking program may analyze available information to determine whether the content of the web page belongs in an objectionable category, such as pornography. If the content blocking program determines that the content belongs in an objectionable category, access to the web page may be blocked by the content blocking program.

To make such a determination, the content blocking program may focus on text within the body of the web page for key terms. However, in some situations, such an approach may be relatively limited because, for example, some web pages may include little text or purposely avoid inclusion of terms that may be used by content blocking programs. For instance, an analysis of about 1500 attempts by teenagers to access pornographic web pages indicated that more than half of the access attempts were image and keyword searches, and about 4% involved access to web pages with little text information. In such situations, content-based filters (i.e., those based on the content of the web page) alone may have difficulty in correctly categorizing these access attempts.

Accordingly, in one implementation, the content blocking program uses the uniform resource locators (URLs) of web pages, either by themselves or in combination with the content of the web pages, to perform the categorization. URLs are used on the World-Wide Web and other environments to identify and locate content segments and files. A URL has a structure including an Internet protocol identifier, a server hostname, and a file path. The path is transparent to the client and the client is free to encode any client request such as search keywords in the path. The following is an example of a URL for a Google image search:

http://images.google.com/images?q=amateur+sex&ie=ISO-8859-1&hl=en

Even if there is little web page content to be used in automatically categorizing a web page, the URL associated with an objectionable web page, especially pornographic web pages, may include information that is helpful in identifying a category for the web page. For example, additional information, such as search terms, may be stored as a part of a URL to be passed to the web server (e.g., "amateur" and "sex" in the example Google image search above). Such terms may indicate the human user's intent. Therefore, even when there is little information available from the content of a web page, the URL may still provide valuable information about the category of the content. In addition to relevant information embedded in URLs, some of the other advantages of using URLs in objectionable content categorization are that URLs may be acquired without downloading content and may be available when web pages are not accessible.

In one implementation, to use the URL of a web page during categorization, the URL is broken into overlapping pieces (e.g., a sequence of n-grams with a range of n's) and then the set or a subset of the overlapping pieces are selected to represent the URL. For instance, a URL may be viewed as a string of characters and, to extract relevant information from the URL, the URL may be broken into n-grams, that is, substrings of n consecutive letters from a given string. The set or a subset of n-grams then may be used to represent the URL.

For example, the 4-grams that may be generated from "pornstar" are "porn", "orns", "rnst", "nsta", and "star". By converting a string to n-grams, the string can be represented as a vector of terms (the n-grams).

This representation of the URL then may be used as input to a classifier that is developed based on a machine-learning algorithm (such as decision trees and support vector machines). The classifier then may provide an indication of whether the webpage belongs to a particular category (e.g., pornography) based on the representation of the URL.

A classifier may be developed by using a set of training URLs (i.e., URLs corresponding to web pages of known categories). The training URLs are broken into overlapping pieces and the set or subset of the overlapping pieces are used to represent the training URLs. A machine learning algorithm is then applied to the representations and corresponding known categories to develop the classifier.

In one implementation, a classifier may be a binary classifier in which there are two categories: a target category (e.g., pornography) and its complementary non-target category. A target category may be one of the objectionable categories and the non-target category refers to the category that includes all web pages which do not belong to the target category. In such an implementation, a separate classifier may be used for each objectionable category to be detected. For example, there may be a binary categorization engine for pornography and a binary categorization engine for violence. The representation of a URL of a given web page of unknown category may then be input into each classifier to determine the likelihood that the web page belongs to the category of pornography and/or violence.

A URL may be broken into n-grams for a single n, or for a range of n's. If n is small (e.g. four), a highly relevant term such as "hardcore" is broken into five 4-grams, none of which is as relevant as "hardcore" in distinguishing porn web pages from clean web pages. If n is large (e.g., six), many of the important terms such as "sex" and "porn" may be missed. Thus, by generating n-grams for a range of n's, fewer relevant terms may be missed. Even if a term has more characters than the largest n, the first n characters of the term may represent the term as long as n is large enough (e.g., 10).

Although a URL-based classifier(s) alone may be able to correctly categorize many objectionable web pages, the URL-based classifier(s) may be used together with a content-based classifier(s). In such an approach, the URL-based engine makes a prediction from a URL, while the content-based engine classifies a web page according to an analysis of its content. Furthermore, the URL-based classifier and/or the content-based classifier may be combined with a manual categorization system.

Referring to FIG. 1, a system 100 is configured to permit the categorization of Internet content by analyzing URLs of web pages. System 100 includes a client 110, a host 120, a network 130, and Internet content sites 140-160.

Each of the client 110, the host 120, and the Internet content sites 140-160 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110, the host 120, and the Internet content sites 140-160 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 110, the host 120, and the Internet content sites 140-160.

The client 110 may include one or more devices capable of accessing content from the host 120. Each of the host 120 and the Internet content sites 140-160 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, or a media player) capable of receiving one or more data units. The information retrieval applications may run on a general-purpose operating system and a hardware platform that includes a general-purpose processor and specialized hardware for graphics, communications and/or other capabilities. In another implementation, the client 110 may include a wireless telephone running a micro-browser application on a reduced operating system with general purpose and specialized hardware capable of operating in mobile environments.

More particularly, the client 110 may be configured to access the Internet content sites 140-160 directly, or through the host 120. Accessing the Internet content sites 140-160 may include accessing a web page with a URL, downloading files, software, or accessing other types of information. The client 110 may send access requests directly to the Internet content sites 140-160, through the network 130, through the host 120, or through the host 120 and the network 130. The host 120 may be configured to receive information requests for Internet content from the client 110 and to request Internet content from the Internet content sites 140-160. The client 110 or host 120 may be configured to analyze URLs of the requested content and associated component pieces of the URLs to categorize the content as discussed with respect to FIG. 3. The client 110 or host 120 may block access requests based on the content categorization.

The network 130 includes hardware and/or software capable of enabling direct or indirect communications between the client 110, the host 120, and the Internet content sites 140-160. As such, the network 130 may include a direct link between the client 110 and the host 120, and the host 120 and the Internet content sites 140-160, or they may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

Figure 2:
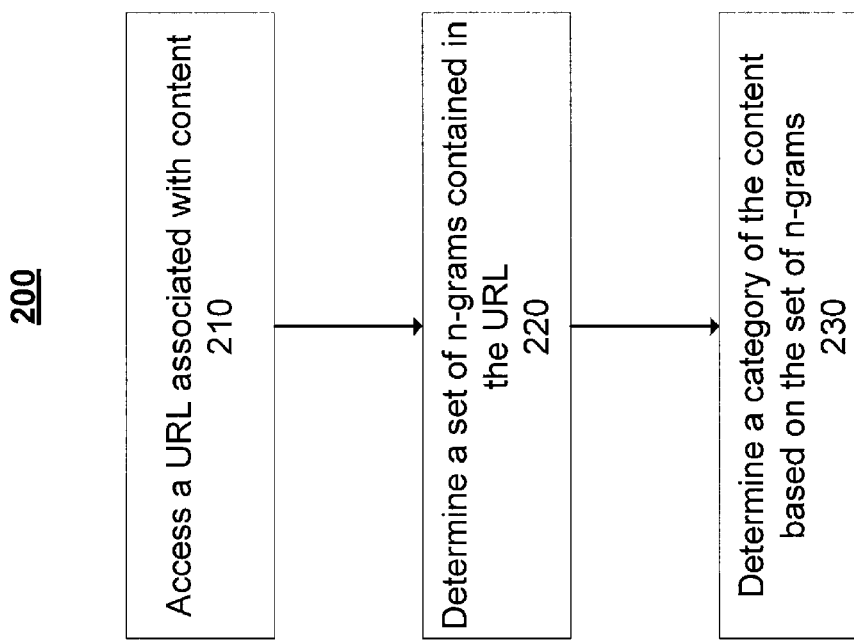
FIG. 2 is a flow chart illustrating an example of a process for categorizing content.
Figure 3:
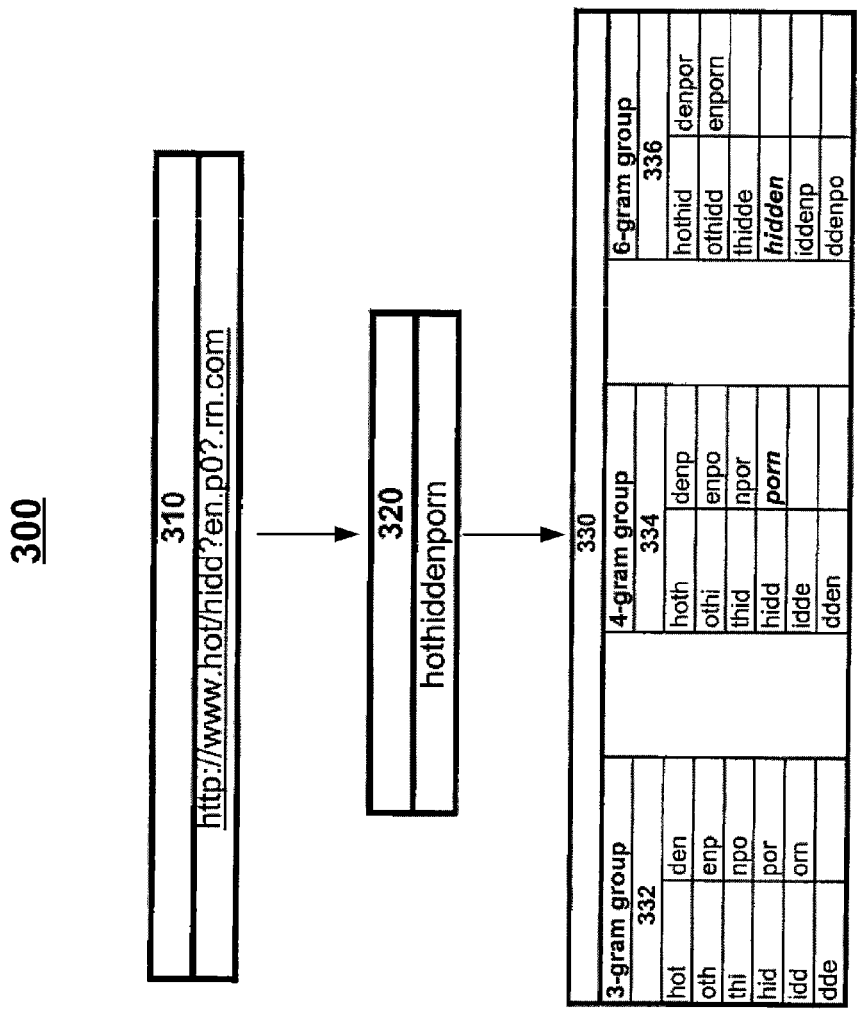
FIG. 3 is an illustration demonstrating the effects of various actions of a process for categorizing content on an example of a URL.

Referring to FIG. 2 a process 200 may be used to categorize Internet (or other) content based on a URL associated with the content. The process 200 may be used to implement a system such as the system 100 of FIG. 1, or another system. FIG. 3 demonstrates the effects of various actions of process 200 on an example of a URL 310.

Initially, the URL 310 associated with the content is accessed (210). The URL 310 may be associated with a web page requested by a client. For example, a user may log into an internet access provider and request a web page. The internet access provider may, in turn, deliver the URL 310 of the web page to a content blocking program residing on a client or a host to determine whether to grant the user access to the web page. When the URL is accessed, pre-processing may be performed on the URL to prepare it for other actions of process 200. For example, characters that may not be representative of content, or are non-alphabetic, may be removed. For example, strings of "www," periods, or slashes may be removed. In one implementation, some characters are removed and replaced with representative characters. For example, a "@" character may be replaced with an "a" character. As an example, URL 310 may be pre-processed to obtain pre-processed URL 320

Next, a set of n-grams contained in the URL are determined (220). The set of n-grams may include the n-grams for one n, or for a range of n's. Accordingly, in one implementation, the pre-processed URL 320 is broken into n-grams for a range of n's to generate multiple groups of component pieces 330. For example, a 3-gram group 332 includes three character component pieces, a 4-gram group 334 includes four character component pieces, and a 6-gram group 336 includes six character component pieces. In particular implementations, n-grams groups are generated for some or all of the integers greater than or equal to three and less than or equal to ten.

Based on the set of n-grams, a category for the content is then determined (230). For instance, the component pieces may be input into one or more categorization engines (described with respect to FIG. 4) developed based on a machine learning algorithm.

Figure 4:
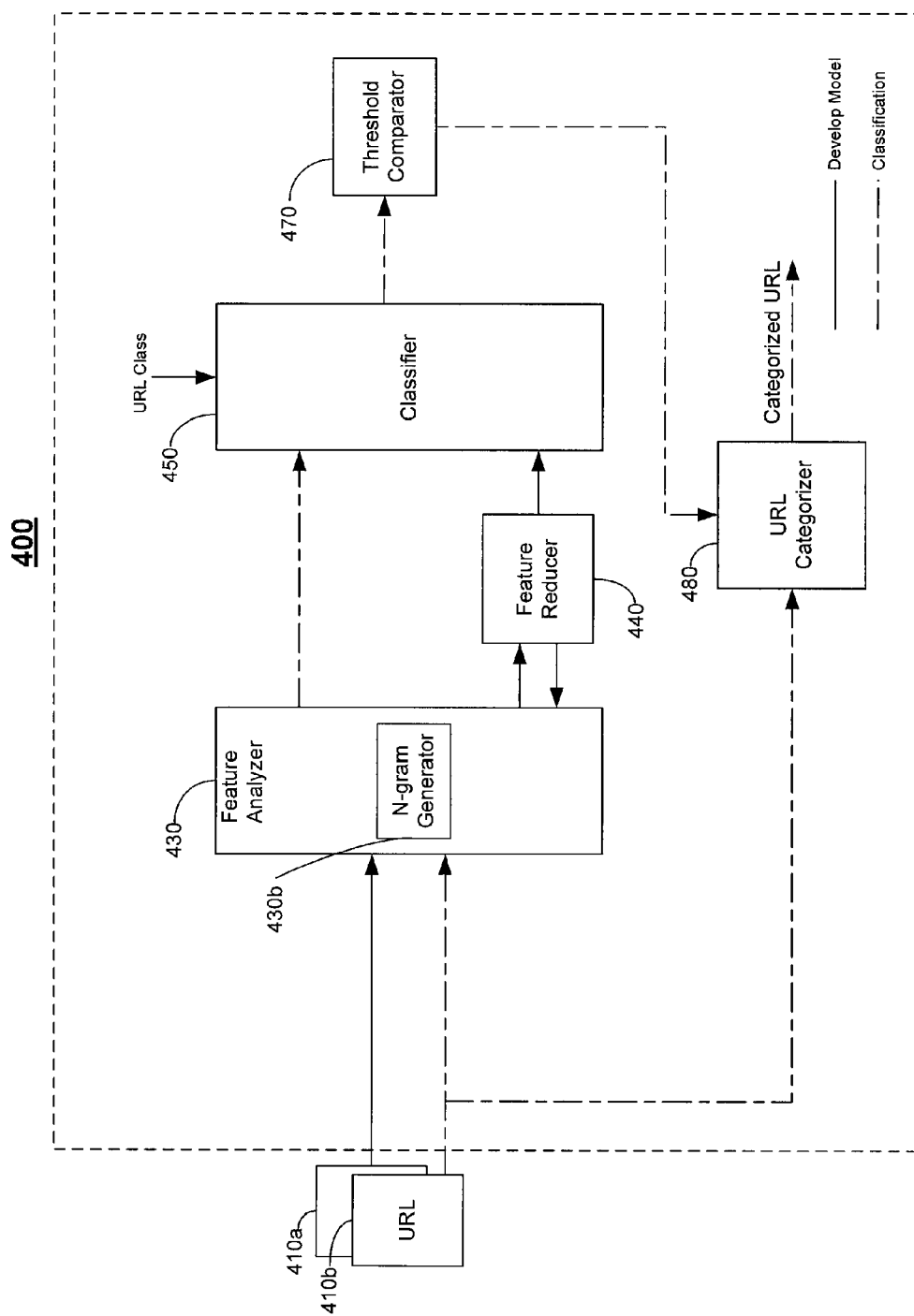
FIG. 4 is a functional block diagram of a uniform resource locator classifier.

FIG. 4 is a functional block diagram of one implementation of a URL-based classifier 400. The URL-based classifier 400 includes a feature analyzer 430, a feature reducer 440, a URL classifier 450, a threshold comparator 470, and a URL categorizer 480. The various components of the URL classifier 400 generally function and cooperate during two phases: training and classification. To simplify an understanding of the operation of the URL classifier 400 during each phase, the data flow between the various URL classifier 400 components is shown separately for each phase. A non-broken line is shown for data flow during the training phase and a broken line with alternating long and short dashed lines indicates the data flow during classification.

Figure 5A:
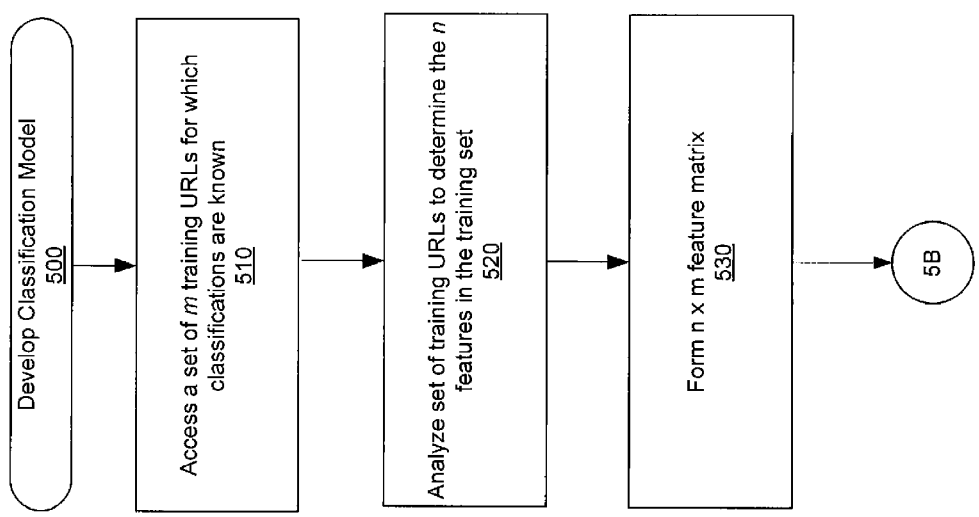
FIGS. 5A and 5B collectively provide a flow chart illustrating a process by which the classifier of FIG. 4 is trained.
Figure 5B:
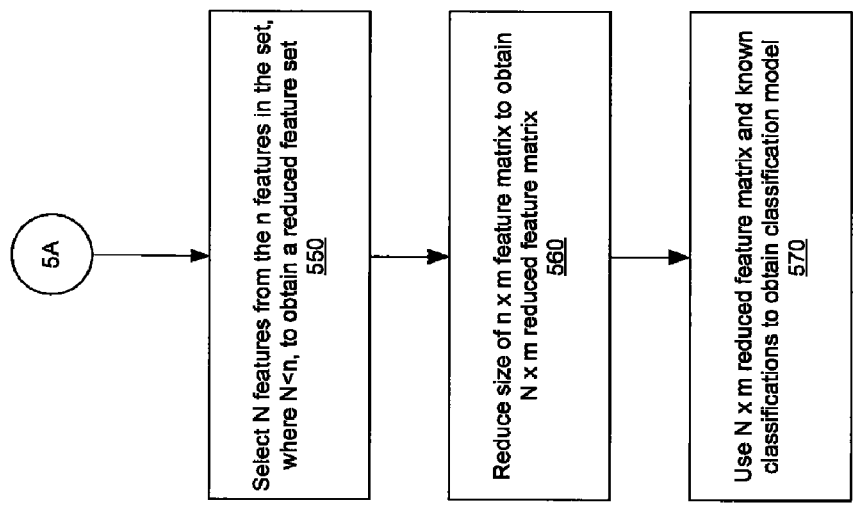

Referring to FIG. 5A, in general, during the training phase (i.e., when a classification model is developed) (500) a set of m URLs (the "training URLs") having a known classification (e.g., known as "adult" or "acceptable") are accessed (510) and used to train the URL classifier 400. Each URL in the unique set of m training URLs is analyzed to obtain the n features (described further below) of the unique set of training URLs (520) and to form an n-by-m feature matrix (530). The features are n-grams contained in the URL, and may be the n-grams for a single n or a range of n's. Referring to FIG. 5B, feature selection is performed to select N features of the n feature set, where N<n (550), and the n-by-m feature matrix is reduced accordingly to an N-by-m reduced feature matrix (560). The N-by-m reduced feature matrix is used along with the known classification of the unique training URLs to obtain an internal classification model (570).

More particularly, and with reference to the unbroken reference flowpath of FIG. 4, a set of m training URLs 410a is input into the URL classifier 400. The set of m unique training URLs are passed to the feature analyzer 430 (530). During training, the feature analyzer 430 analyzes the set of m unique training URLs to determine n features (the n-grams contained in the URLs) of the set of m unique training URLs (the "feature set"). The feature analyzer 430 includes an N-gram generator 430b. The N-gram generator 430b receives the URLs and produces the appropriate set of n-grams in the URLs. The URLs may be pre-processed to remove characters unrepresentative of content (e.g., slashes or punctuation) before the n-grams are generated.

In addition to n-grams, the feature set may be composed of other features. For example, the feature set may include various other attributes of the URLs, such as formatting attributes (e.g., all caps), address attributes (e.g., domain of the URL), or other features of a URL.

The feature analyzer 430 creates a sparse n-by-m feature matrix (where n is the total number of text and non-text features) from the results of the n-gram generator 430b (550). Each entry in the matrix is a binary value that indicates whether the nth feature is present in the mth URL.

The n-by-m feature matrix is provided to the feature reducer 440, which reduces the n-by-m feature matrix to a sparse N-by-m reduced feature matrix (where N is less than n), using, for example, mutual information (550 and 560). In other words, the feature reducer 440 selects a reduced set of the n features (the "reduced feature set") and reduces the size of the feature matrix accordingly. Techniques other than mutual information may be used, alternatively or additionally, to implement such feature selection. For example, document frequency thresholding, information gain, or term strength may be used. In addition, some implementations may forego feature selection/reduction and use the n element feature set (i.e., use all of the features from the set of m unique training URLs).

Some implementations perform feature selection based on an R-measure, which is a feature selection measure in which terms from the target and non-target categories are ranked separately. The R-measure may provide a parameter to adjust to favor frequent or rare terms.

The R-measure may be represented by $$R(t) = \frac{P(t \mid C)}{P(t \mid \overline{C}) + r} \times r,$$

where t is n-gram, C is the target category, $\overline{C}$ is the non-target category, and r is a parameter taking a value between 0 and 1. $P(t|C)$ is the probability that t occurs in a URL in the target class, where $P(t|\overline{C})$ is the probability that t occurs in the a URL in a non-target class. $P(t|C)$ and $P(t|\overline{C})$ are computed as $$\frac{|C_t|}{|C|}$$

and $$\frac{|\overline{C}_t|}{|\overline{C}|},$$

respectively. $|C_t|$ and $|\overline{C}_t|$ are respectively the numbers of URLs in C and $\overline{C}$ in which t occurs and $|C|$ and $|\overline{C}|$ are respectively the numbers of URLs in C and $\overline{C}$. The probabilities may also be computed using the frequencies of t.

The value of $$\frac{P(t \mid C)}{P(t \mid \overline{C}) + r}$$

ranges from 0 to 1/r, and R(t) ranges from 0 to 1. A smaller r favors less frequent but more discriminate n-grams, while a larger r prefers more frequent but less discriminate n-grams. For example, assume that both the target and non-target classes have 100 URLs, and also assume that t1 occurs in 10 target class URLs and 0 non-target class URLs and t2 occurs in 50 target class URLs and 10 non-target class URLs. When r 0.01, R(t1)=0.1 and R(t2)=0.045. With r=0.01, t1 is a more relevant term than t2. When r=0.1, R(t1)=0.01 and R(t2)= 0.025, so t2 becomes more relevant than t1.

To perform feature selection, all n-grams (features) in the training URLs may be ranked using the R-measure and a number of top ranked features may be selected to form the reduced feature set.

In some implementations, prior to feature reduction, redundant n-grams are removed. In general, generating n-grams for a range of n's may result in a large number of redundant n-grams. For example, three 3-grams, two 4-grams, and one 5-gram may be generated for the term "adult." In addition, some n-grams with n>5 consist of "adult" as a substring. Because "adult" is a highly relevant feature and receives a high score from the feature selection measure, all these n-grams that are a substring of "adult" or have "adult" as a substring would probably also receive a high score. However, these n-grams do not add new evidence for recognizing porn web pages. Instead, the n-grams may increase difficulty in learning an optimal model.

One method for removing redundant n-grams is to use a dictionary of terms. The n-grams that are not in the dictionary are removed. The dictionary may be generated from the content of the web pages corresponding to the training URLs for the same category. For example, the dictionary for the pornography category may be generated using all training web pages of pornography. In generating the dictionary of an objectionable category, a list of terms may be generated from the training web pages of the category and another list of terms may be generated from a set of clean web pages. Then, the R-measure is applied to rank all terms of the objectionable category and a number (e.g., 2000) of top rank terms are selected to form the dictionary for the category.

In this situation, after redundant n-grams are removed, the R-measure may be applied to compute R-scores for all remaining n-grams, and then n-grams of each category are ranked according to their R-scores and a N (e.g., 200) of the top ranked n-grams are selected for the reduced feature set.

The N selected features (n-grams) are communicated to the feature analyzer 430 (560), which analyzes the incoming URLs during the classification phase for the N selected features instead of all of the features in the incoming URLs.

The N-by-m reduced feature matrix is input into the URL classifier 450. Each row of the N-by-m reduced feature matrix corresponds to one of the unique training URLs and contains data indicating which of the N selected features are present in the corresponding training URL. Each row of the reduced feature matrix is applied to the URL classifier 450. As each row is applied to the URL classifier 450, the known classification of the training URL to which the row corresponds also is input.

In response to the N-by-m reduced feature matrix and corresponding classifications, the URL classifier 450 builds an internal classification model that is used to evaluate future URLs with unknown classification (i.e., non-training URLs) (570). The URL classifier 450 may be implemented using known probabilistic or other classification techniques. For example, the URL classifier 450 may be a support vector machine (SVM), a Naïve Bayesian classifier, or a limited dependence Bayesian classifier. The URL classifier 450 also may be implemented using well-known techniques that account for misclassification costs when constructing the internal model. For example, A. Kolcz and J. Alspector, SVM-based Filtering of URL Spam with Content-specific Misclassification Costs, ICDM-2001 Workshop on Text Mining (TextDM-2001), November 2001, provides a discussion of some techniques for training a classifier in a manner that accounts for misclassification costs.

In one implementation, the classifier is developed as a prototype of the target category. A prototype is a set of weighted n-grams, generated using m n-grams with the highest R-scores, where m is a user defined parameter. The weight of an n-gram is the R-score of the n-gram. An algorithm for categorizing a URL based on a prototype model is described below with respect to the classification stage 600.

Figure 6:
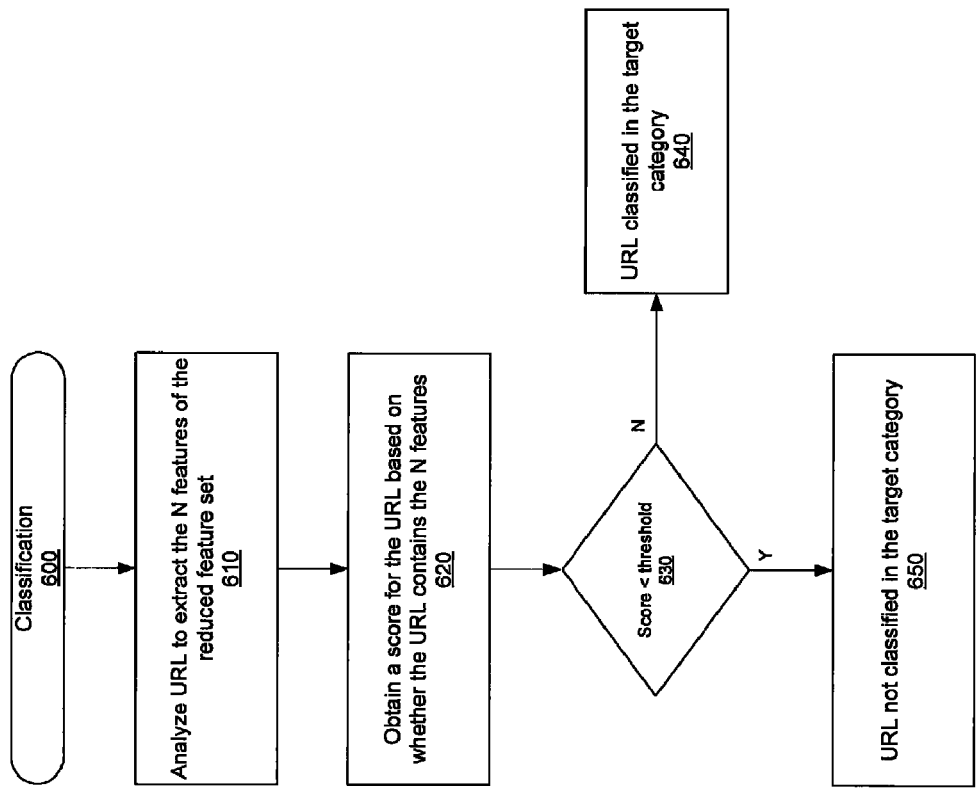
FIG. 6 is a flow chart illustrating a process by which the classifier of FIG. 4 classifies incoming uniform resource locators.

Referring to FIG. 6, in general, during classification (600) each URL in the incoming URL stream is analyzed to determine whether or not it contains the N features of the reduced feature set (610). This data is used to obtain a score for the URL (620). The URL is classified by comparing the score to a classification threshold. The precise comparison scheme is a matter of choice. As one example, if the score is equal to or above the classification threshold (630), the URL is classified in the target category (640). If the classification output is below the classification threshold, the URL is not classified in the target category (650).

The following is an algorithm for categorizing URLs when the classifier is implemented using a prototype of the target category, as described above:

FOR each test URL u
    Convert u into a vector of n-grams uv
    score(u, Target-Cat)=0;
    FOR each n-gram g in uv
        IF g is an n-gram of the prototype P
            score(u, Target-Cat)+=weight(g, P)
        score(u, Target-Cat)=score(u, Target-Cat)/totalWeight (Target-Cat)
        IF score(u, Target-Cat)>threshold
        u belongs to Target-Cat Target-Cat is the target category, and totalWeight(Target-Cat) is the sum of weights of all n-grams in the prototype.

Figure 7:
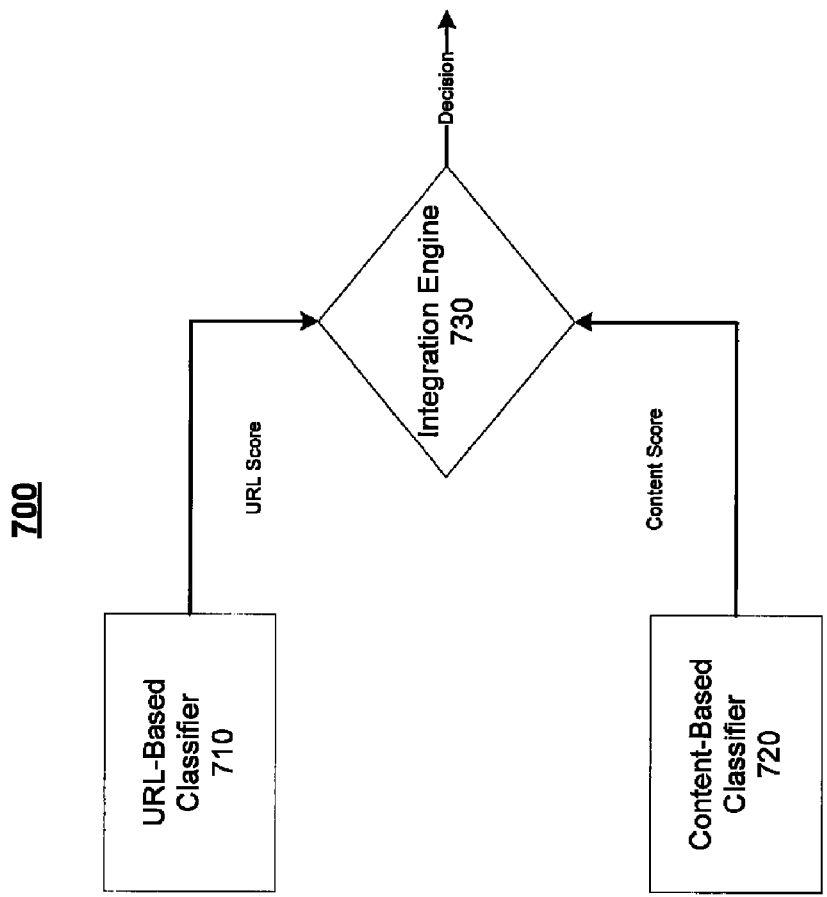
FIG. 7 is a functional block diagram of a integration engine system.

Referring to FIG. 7, a classification system 700 includes a URL-based classifier 710, a content-based classifier 720, and an integration engine 730. The URL-based classifier 710 may be the classifier 400 of FIG. 4, or another classifier. Referring to FIG. 8, a flow chart illustrates the process 800 by which the integration engine determines a decision.

The URL-based classifier 710 analyzes the URL and determines a URL score that is output to the integration engine 730 (810). The content-based classifier 720 analyzes the content associated with a URL and determines a content score that is output to the integration engine 730 (820). Content analyzed by the content-based analyzer may include text within the body of a web page, images or files within the body of a web page, or other characteristics associated the content of a web page, such as, for example, the number of thumbnail pictures included.

The integration engine 730 determines whether the content belongs to the target category based on the received scores (830). Three different approaches to implement integration engine 730 are described below; however, other approaches may be used. In the approaches described below, the URL-based classifier 710 is designed to produce a score between 0 and 1 and the content-based classifier 720 is designed to produce a score between −1 and 1.

The first approach is an "OR" approach. In the "OR" approach, the integration engine 730 decides content belongs to the target category if either score is above a threshold value (i.e., an "OR" logical process). Otherwise, the content is determined to not belong to the target class. The "OR" approach is simple to use in production, but may cause an increased false positive rate. In such an implementation, the content-based classifier 720 may not determine a content score if the URL-based classifier 710 is above the threshold, and the integration engine 730 simply decides the content belongs to the target category. In other words, the operation of the URL-based classifier 710 and the content-based classifier 720 may be staged such that the URL-based classifier provides its score to the integration engine 730 and, only if the integration engine 730 determines that the URL-based score does not exceed the threshold, the content-based classifier 720 produces its score and provides it to the integration engine 730, which then determines whether the content-based score exceeds the threshold The next approach is a linear weighted sum approach. In this approach, a combined score is produced from the linear weighted sum of the two scores, with the sum of the two weights being equal to 1. For example, Combined_Score=0.7*Content_Score+0.3*URL_Score. A threshold is then applied to the combined score to determine whether the content belongs to the target category.

The third approach is a probabilistic sum approach. In this approach, the combined score is the probabilistic sum of the two scores: Combined_Score=URL_Score+Content_Score−URL_Score*Content_Score, when the score of the content-based classifier 720 is not smaller than 0. When the score of the content-based classifier 720 is smaller than 0, Combined_Score=URL_Score+Content_Score. A threshold is then applied to the combined score to determine whether the content belongs to the target category or not.

Among these three approaches, the URL-based classifier and the content-based classifier play similar roles because they work independently. However, the impact of the URL engine may be smaller in the weighted sum and probabilistic sum approaches because the score returned by the URL engine may normally be much smaller than the score returned by the content engine. The small URL score may be due to the fact that each URL may only include few relevant n-grams while the web content may consist of many relevant terms.

A number of implementations have been described. Nevertheless, it will be understood that various modifications may be made. For example, a single classifier may use both the URL and content to determine a score. Such an implementation may include a single classifier that generates n-grams from both a web page's URL and content and then uses the n-grams to determine a score. Furthermore, useful results still could be achieved if steps of the disclosed techniques were performed in a different order and/or if components in the disclosed systems were combined in a different manner and/or replaced or supplemented by other components. Accordingly, implementations other than those specifically described are within the scope of the following claims.

What is claimed is:

1. A computer implemented method of categorizing content, the method comprising:
    accessing a uniform resource locator associated with content requested by a user;
    processing the uniform resource locator to generate a set of multiple n-grams contained in the uniform resource locator, wherein the processing includes using a plurality of different n values to generate the set of multiple n-grams, the set including n-grams of different character lengths;
    providing the set of multiple n-grams to a classifier for determination of a classification score based on the set of multiple n-grams, wherein each of the n-grams is weighted according to the formula:

$$R(t) = \frac{P(t \mid C)}{P(t \mid \overline{C}) + r} * r$$

wherein t is an n-gram, C is a target category, $\overline{C}$ is a non-target category, and r is a parameter;

comparing the classification score to a threshold;
classifying the content into the target category or the non-target category based on the comparison of the classification score to the threshold;
allowing the user to access the content when the content is classified into the non-target category; and
blocking access to the content by the user when the content is classified into the target category.

2. The method of claim 1 wherein processing the uniform resource locator to generate a set of n-grams includes replacing an "@" character with an 'a' character.

3. A computer implemented method of categorizing content, the method comprising:
accessing, from computer storage, a uniform resource locator associated with content;
determining a set of n-grams contained in the uniform resource locator, wherein a plurality of different n values are used to determine the set of n-grams, the set of n-grams including n-grams of different character lengths;
determining a category of the content based on the set of n-grams, wherein each of the n-grams is weighted according to the formula:

$$R(t) = \frac{P(t \mid C)}{P(t \mid \overline{C}) + r} * r$$

wherein t is an n-gram, C is a target category, $\overline{C}$ is a non-target category, and r is a parameter; and
storing, in the computer storage, an association between the determined category and the content.

4. The method of claim 3 further comprising processing the uniform resource locator to remove characters unrepresentative of content.

5. The method of claim 3 wherein processing the uniform resource locator includes removing a non-alphabetical character and replacing the character with one or more alphabetical characters.

6. The method of claim 3 wherein the plurality of different n values includes a range of n's greater than or equal to three and less than or equal to ten.

7. The method of claim 3 wherein determining a category of the content comprises:
using a classifier to determine a score based on the set of n-grams; and
comparing the score to a threshold.

8. The method of claim 3 wherein determining a category of the content comprises determining a category for the content based on the set of n-grams and an analysis of the content.

9. The method of claim 3 wherein determining a category of the content comprises:
using a first classifier to determine a first score based on the set of n-grams;
using a second classifier to determine a first score based on the set of n-grams;
using a second classifier to determine a second score based on the content, wherein the first score is separate from the second score; and
determining a category of the content based on both the first score and the second score.

10. The method of claim 3 wherein the content is included in a web page.

11. The method of claim 4 wherein processing the uniform resource locator includes removing a non-alphabetical character.

12. The method of claim 9 wherein determining a category of the content based on the first score and the second score comprises generating a sum of the first score and the second score and comparing the sum to a threshold.

13. The method of claim 9 wherein determining a category of the content based on the first score and the second score comprises determining if either of the first score or the second score is above a threshold.

14. The method of claim 9 wherein determining a category of the content based on the first score and the second score comprises combining the first score with the second score to generate a combined classification score such that either the first score or the second score contributes more to the combined classification score than the other, and comparing the combined classification score to a threshold.

15. A system for categorizing content, the system comprising:
at least one processing device;
a storage storing instructions for causing the at least one processing device to implement:
an n-gram generator configured to access a uniform resource locator (URL) associated with content and determine a set of n-grams contained in the uniform resource locator;
a classifier configured to determine a URL score based on the set of n-grams, wherein each of the n-grams is weighted according to the formula:

$$R(t) = \frac{P(t \mid C)}{P(t \mid \overline{C}) + r} * r$$

wherein t is an n-gram, C is a target category, $\overline{C}$ is a non-target category, and r is a parameter that favors the n-gram based on a frequency and distinctness of the n-gram; and
a categorizer configured to categorize the content based on the URL score.

16. The system of claim 15 wherein, to categorize the content based on the URL score, the categorizer is configured to compare the URL score to a threshold.

17. The system of claim 15 wherein, to determine the set of n-grams contained in the uniform resource locator, the n-gram generator is configured to determine a set of n-grams that includes n-grams for a range of n's.

18. The system of claim 15 further comprising:
a content-based classifier configured to determine a content score based on the content; and
wherein the categorizer is configured to categorize the content based on the URL score and the content score.

19. The system of claim 15 wherein the content is included in a web page.

20. The system of claim 18 wherein the categorizer is further configured to:
categorize the content based on the URL score and the content score by combining the URL score with the content score to generate a combined classification score, wherein either the URL score or the content score contributes more to the combined classification score than the other; and
compare the combined classification score to a threshold.

21. A system for categorizing content, the system comprising:
at least one processing device;
a storage storing instructions for causing the at least one processing device to implement:

a URL-based classifier configured to produce a first score based on a set of n-grams contained in a uniform resource locator associated with content, wherein the set of n-grams is based on multiple different n-values and includes n-grams of different character lengths, wherein each of the n-grams is weighted according to the formula:

$$R(t) = \frac{P(t\mid C)}{P(t\mid \overline{C})+r} * r$$

wherein t is an n-gram, C is a target category, $\overline{C}$ is a non-target category, and r is a parameter that favors the n-gram based on a frequency and distinctness of the n-gram;
  a content-based classifier configured to produce a second score based on the content, wherein the second score is separate from the first score; and
  an integration engine configured to determine a category of the content based on both the first score and the second score.

22. The system of 21 wherein, to determine a category of the content based on both the first score and the second score, the integration engine is configured to generate a sum of the first score and the second score and compare the sum to a threshold.

23. The system of claim 21 wherein, to determine a category of the content based on both the first score and the second score, the integration engine is configured to determine if the first score exceeds a threshold and, if the first score does not exceed the threshold, to determine if the second score exceeds the threshold.

24. The system of claim 21 where the integration engine is further configured to:
  determine a category of the content based on both the first score and the second score by combing the first score with the second score to generate a combined classification score, wherein either the first score or the second score contributes more to the combined classification score than the other; and
  compare the combined classification score to a threshold.

25. The system of claim 22 wherein, to generate the sum of the first score and the second score, the integration engine is configured to generate a weighted linear sum of the first score and the second score.

26. The system of claim 22 wherein, to generate the sum of the first score and the second score, the integration engine is configured to generate a probabilistic sum of the first score and the second score.

27. A computer implemented method of categorizing content, the method comprising:
  accessing a uniform resource locator (URL) associated with the content; processing the uniform resource locator to generate a set of multiple n-grams contained in the uniform resource locator, wherein a plurality of different n values are used to process the uniform resource locator, and the set of multiple n-grams includes n-grams of different character lengths;
  providing the set of multiple n-grams to a URL classifier, wherein the URL classifier is configured to determine a first classification score based on the set of multiple n-grams, wherein each of the n-grams is weighted according to the formula:

$$R(t) = \frac{P(t\mid C)}{P(t\mid \overline{C})+r} * r$$

wherein t is an n-gram, C is a target category, $\overline{C}$ is a non-target category, and r is a parameter that favors the n-gram based on a frequency and distinctness of the n-gram;
  accessing at least a portion of the content;
  providing at least the portion of the content to a content classifier, wherein the content classifier is configured to determine a second classification score based on at least the portion of the content, the second classification score being separate from the first classification score;
  combining the first classification score with the second classification score to generate a combined classification score;
  comparing the combined classification score to a threshold; and
  classifying the content into the target category or the non-target category based on the comparison of the classification score to the threshold.

28. The method of claim 27 wherein combining the first classification score with the second classification score to generate a combined classification score includes generating a sum of the first score and the second score.

29. The method of claim 27 wherein combining the first classification score with the second classification score to generate a combined classification score includes combining the first classification score with the second classification score such that either the first classification score or the second classification score contributes more to the combined classification score than the other.

30. The method of claim 28 wherein generating a sum of the first score and the second score includes generating a weighted linear sum of the first score and the second score.

31. The method of claim 28 wherein generating a sum of the first score and the second score included generating a probabilistic sum of the first score and second score.

* * * * *